C. E. HULTGREEN.
ROTARY PUMP.
APPLICATION FILED JUNE 4, 1918.

1,365,245.

Patented Jan. 11, 1921.
3 SHEETS—SHEET 1.

Inventor
Chas. E Hultgreen
By Harry Schwede
Attorney

C. E. HULTGREEN.
ROTARY PUMP.
APPLICATION FILED JUNE 4, 1918.
1,365,245.
Patented Jan. 11, 1921.
3 SHEETS—SHEET 3.
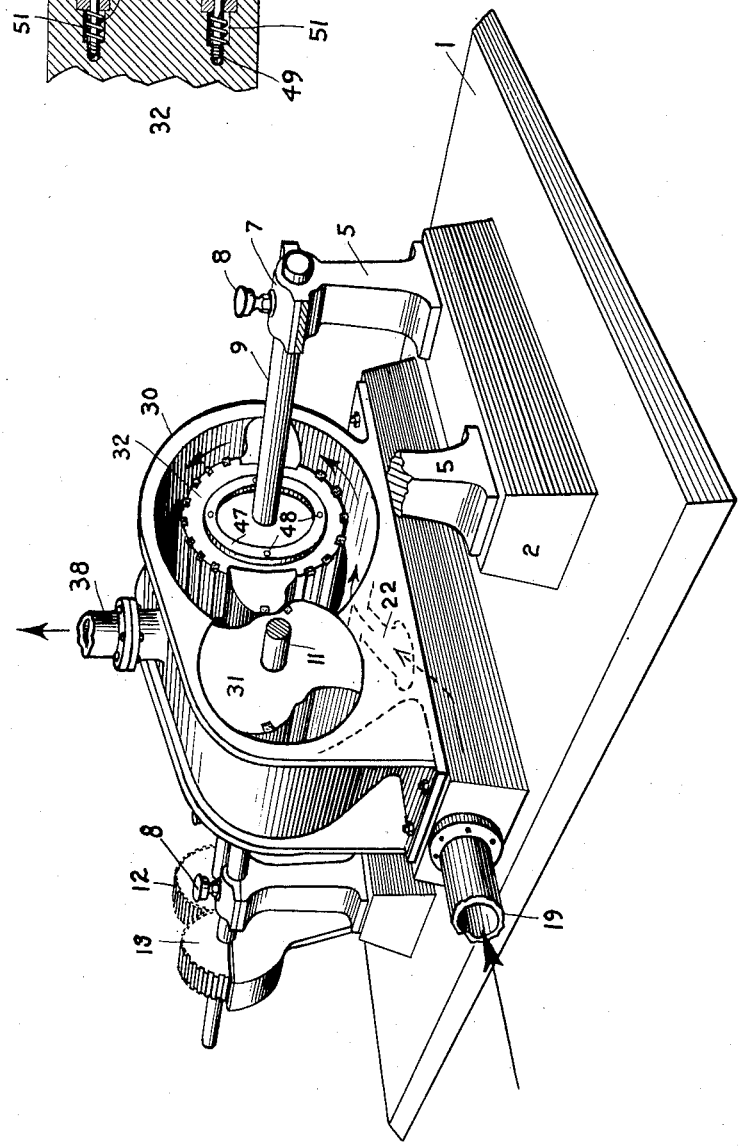
Inventor
Chas. E. Hultgreen
By Harry O. Schroeder
Attorney

UNITED STATES PATENT OFFICE.

CHARLES E. HULTGREEN, OF OAKLAND, CALIFORNIA.

ROTARY PUMP.

1,365,245.   Specification of Letters Patent.   Patented Jan. 11, 1921.

Application filed June 4, 1918. Serial No. 238,113.

*To all whom it may concern:*

Be it known that I, CHARLES E. HULTGREEN, citizen of the United States, residing at Oakland, in the county of Alameda and State of California, have invented certain new and useful Improvements in Rotary Pumps, of which the following is a specification.

This invention is an improved rotary pump.

The object of the invention is to provide a pump which will discharge a continuous flow of fluid by the co-action of opposed rotors keyed to shafts driven at the same speed in opposite directions.

This object is fully accomplished in the novel structure described in the following specification and illustrated in the accompanying drawing, in which, Figure 1 is a plan view of my improved rotary pump.

Fig. 4 is a perspective view of my improved pump.

Fig. 5 is a sectional view of a detail.

Figure 1:
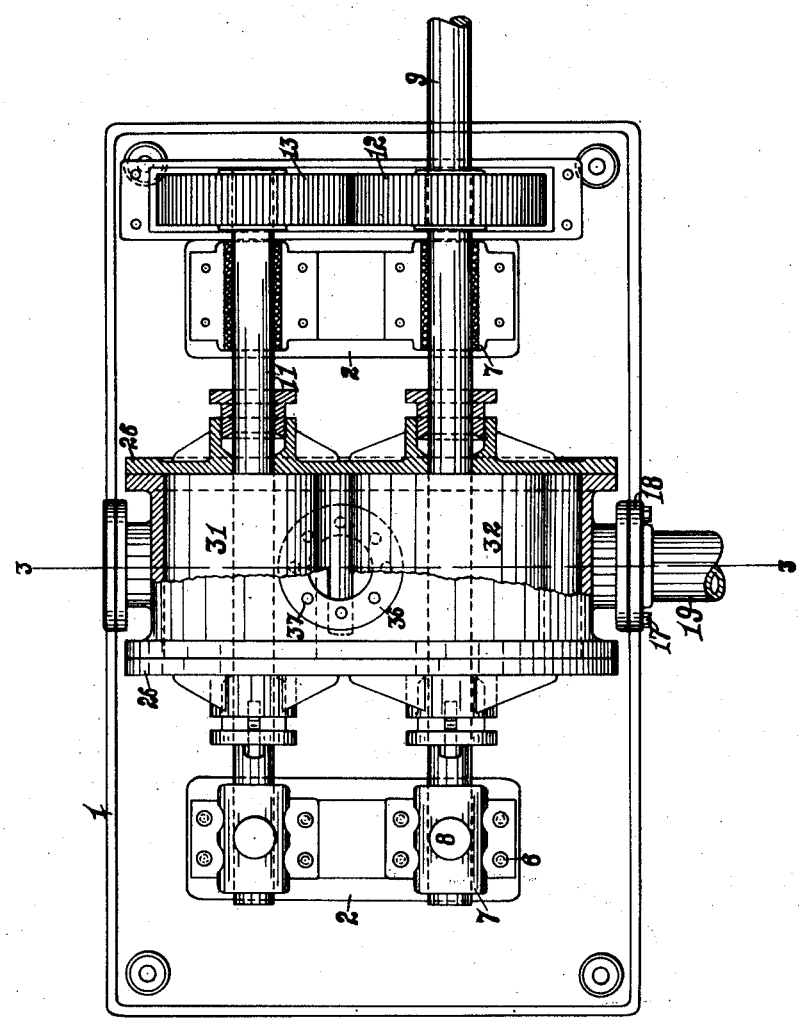
Figure 2:
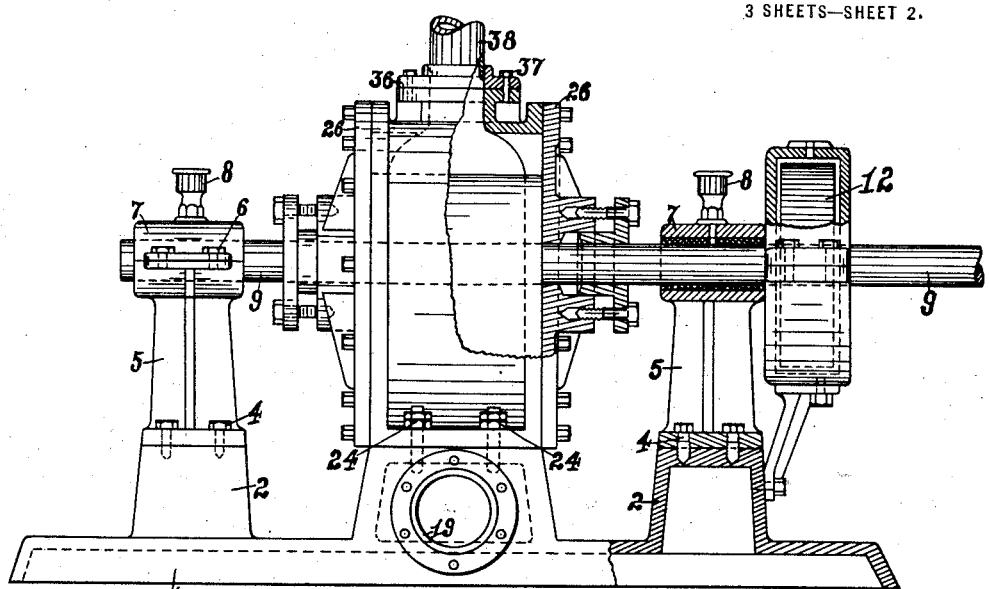
Fig. 2 is a side view of same, portions being broken away and shown in cross section.

Referring to the drawings, 1 indicates a bed plate integral with which are four similar bearing posts 2. To the upper surfaces of the posts 2 are bolted, as shown at 4, twin lower bearings 5. Secured to the upper surfaces of lower bearings 5 by bolts 6 are upper bearings 7 provided with grease cups 8.

Rotating in the bearings before mentioned, are two alined or parallel shafts 9 and 11 on which are respectively gear wheels 12 and 13, meshing so that when either shaft is driven it will drive the other shaft in the opposite direction.

Near the center of the bed plate 1 and integral therewith is a fluid chamber 14 having an inlet port 16 over which is bolted, as shown at 17, a flange 18 for connection with a pipe 19. The chamber 14 is provided with a discharge port 21 registering with an inlet port 22 in a rotor chamber casing 23 bolted to the upper surface of bed plate 1 by bolts 24.

Figure 3:
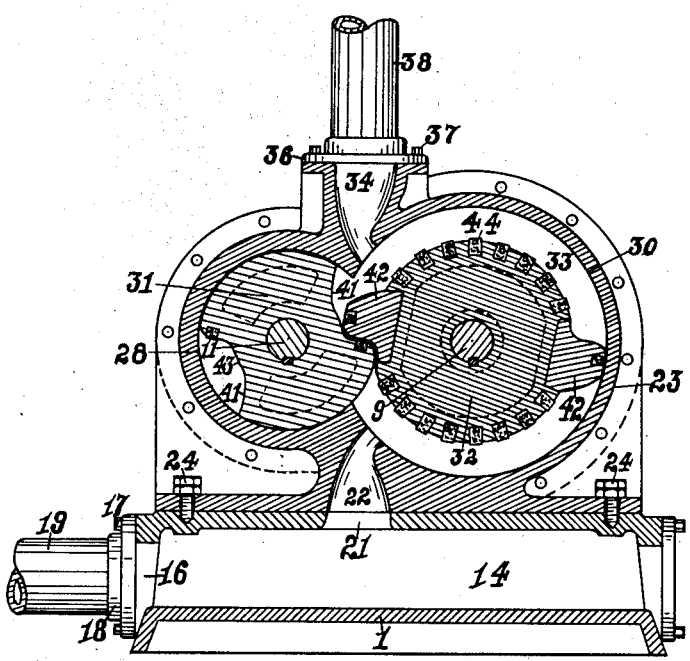
Fig. 3 is a vertical section taken on the line 3—3 of Fig. 1.

The ends of rotor chamber casing 23 are closed by plates 26 bolted to said casing by bolts 27. The rotor chamber in casing 23 is in the form of two overlapping circles of different size as shown in the cross section Fig. 3.

The smaller circular portion 28 is adapted to slidingly fit the perimeter of a rotor 31 keyed to the shaft 11, while the larger circular portion 30 of the casing 23 is adapted to encircle a rotor 32 keyed to shaft 9 at a distance therefrom being of a greater diameter to form a fluid chamber 33 for conducting fluid from the inlet port 22 of the rotor chamber to an outlet or discharge port 34 integral with said casing.

The discharge port 34 is covered by a flange 36 bolted to the casing 23 by bolts 37. The flange 36 is internally threaded for connection with a discharge pipe 38.

The rotor 31 is provided with longitudinal grooves 41 in its peripheral surface for contacting during revolution with either of two pistons 42 set in the rotor 32.

The shape of the grooves 41 is determined by continuous contact with the pistons 42. A portion 43 of the bottom of the grooves 41 is coaxial with the shaft 11 and the remainder is of irregular curved shape described by the rotation of the pistons 42.

Both rotors 31 and 32 are provided with insets 44 of suitable packing material for effecting a water tight joint with the interior wall of the rotor chamber and with each other during rotation.

In order to prevent leakage around the ends of rotor 32, I have provided in the ends of said rotor an annular groove for a ring 47 shown in Figs. 4 and 5.

The surface of the ring is normally on a line with the end surface of the rotor 32, but is caused to extend outwardly and contact at all times during revolution with the inner surface of plates 26, by expansion springs 50.

The rings 47 are held in place by bolts 48, the heads of which are countersunk in the outer face of said rings. The bolts 48 are threaded to enter the reduced tapped portion 49 of holes 51. The springs 50 surround bolts 48 and bear at one end against the bottom of holes 51 and at the opposite ends against the inner surfaces of rings 47.

What I claim as new and wish to secure by Letters Patent is:

1. In a rotary pump, a fluid chamber having a circular peripheral wall, a piston rotor mounted in said chamber and of less diameter than the latter, a piston abutment extending from the periphery of the rotor and contacting with the peripheral wall of said chamber, a valve rotor partially projecting into said chamber through the peripheral wall of the latter and provided with a peripheral recess in which said abutment will engage, the surface of said abutment engaging the peripheral wall of the chamber being extended on an arc corresponding to the curvature of said wall, the surface of the abutment in advance of said arced surface being concaved and the surface of the abutment to the rear of said arc surface being convex, the walls of said recess corresponding with said curved surfaces of said piston abutment.

2. In a rotary pump, a fluid chamber having a circular peripheral wall, a piston rotor mounted in said chamber and of less diameter than the latter, a piston abutment extending from the periphery of the rotor and contacting with the peripheral wall of the chamber, a valve rotor partially projecting into said chamber through the peripheral wall of the latter and provided with a peripheral recess in which said abutment will engage, the forward surface of the abutment being concaved and the rear surface being convexed, the walls of said recess corresponding with the curved surfaces of said piston abutment.

3. A rotary pump as set forth in claim 1, further characterized by a packing projecting from the forward surface of the recess, and a packing projecting from the arc surface of the piston abutment.

In testimony whereof I affix my signature.

CHARLES E. HULTGREEN.